US011184335B1

(12) United States Patent  
Beloussov et al.

(10) Patent No.: US 11,184,335 B1  
(45) Date of Patent: Nov. 23, 2021

(54) REMOTE PRIVATE KEY SECURITY

(71) Applicant: Acronis International GmBh, Shaffhausen (CH)

(72) Inventors: Serguei M. Beloussov, Costa Del Sol (SG); Alexander Tormasov, Moscow (RU); Stanislav Protasov, Moscow (RU)

(73) Assignee: Acronis International GmbH

( * ) Notice: Subject to any disclaimer, the term of this patent is extended or adjusted under 35 U.S.C. 154(b) by 0 days.

(21) Appl. No.: 15/165,303

(22) Filed: May 26, 2016

Related U.S. Application Data

(60) Provisional application No. 62/168,027, filed on May 29, 2015.

(51) Int. Cl.  
*H04L 29/06* (2006.01)

(52) U.S. Cl.  
CPC ........ *H04L 63/0442* (2013.01); *H04L 63/061* (2013.01); *H04L 63/0861* (2013.01); *H04L 63/20* (2013.01)

(58) Field of Classification Search  
None  
See application file for complete search history.

(56) References Cited

U.S. PATENT DOCUMENTS

| | | | |
|---|---|---|---|
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,475,282 B2 | 1/2009 | Tormasov et al. | |
| 7,536,547 B2 * | 5/2009 | Van Den Tillaart | G06F 21/606 713/165 |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,831,789 B1 | 11/2010 | Tsypliaev et al. | |
| 7,844,834 B2 * | 11/2010 | Leone | H04L 63/0428 380/273 |
| 7,886,120 B1 | 2/2011 | Tormasov | |
| 7,895,403 B1 | 2/2011 | Tormasov et al. | |

(Continued)

FOREIGN PATENT DOCUMENTS

CN    WO2014036977    *   3/2014

*Primary Examiner* — Piotr Poltorak  
(74) *Attorney, Agent, or Firm* — K&L Gates LLP

(57) ABSTRACT

A method for remote private key security is described. The method may include generating a private key and may further include generating encrypted data by encrypting data using an encryption algorithm, wherein the data is stored at a first location and the private key is for the encrypted data. The method may also include transmitting the private key to a remote private key deposit at a second location. The method may additionally include transmitting the encrypted data to a remote data center at a third location. Moreover, the method may include permitting access to the private key at the remote private key deposit to an individual at the second location in response to confirming an identity of the individual present at the second location.

28 Claims, 5 Drawing Sheets

(56) References Cited

U.S. PATENT DOCUMENTS

| | | | |
|---|---|---|---|
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,166,565 B1 * | 4/2012 | Tormasov | G06Q 10/101 380/277 |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,620,815 B1 * | 12/2013 | Wagner-Krankel | G06F 21/6209 705/50 |
| 8,645,748 B1 | 2/2014 | Chepel et al. | |
| 8,707,034 B1 * | 4/2014 | Ryan | G06F 21/6218 707/784 |
| 8,732,121 B1 | 5/2014 | Zorin et al. | |
| 8,856,927 B1 | 10/2014 | Beloussov et al. | |
| 8,885,830 B2 * | 11/2014 | Tahan | G06F 21/606 380/262 |
| 8,996,830 B1 | 3/2015 | Lyadvinsky et al. | |
| 9,202,076 B1 * | 12/2015 | Chazin | G06F 21/6218 |
| 9,544,137 B1 * | 1/2017 | Brandwine | H04L 9/083 |
| 9,762,553 B2 | 9/2017 | Ford | H04L 63/0428 |
| 9,913,135 B2 * | 3/2018 | Perold | H04W 12/04 |
| 2002/0029339 A1 * | 3/2002 | Rowe | G06Q 20/04 713/182 |
| 2002/0071566 A1 * | 6/2002 | Kurn | H04L 63/062 380/281 |
| 2002/0091834 A1 * | 7/2002 | Isozu | H04L 29/06027 709/227 |
| 2002/0177449 A1 * | 11/2002 | McDonnell | G06F 21/00 455/456.1 |
| 2002/0184537 A1 * | 12/2002 | Inokuchi | G06F 21/10 726/6 |
| 2003/0014640 A1 * | 1/2003 | Loyd | G06F 21/608 713/182 |
| 2003/0078918 A1 * | 4/2003 | Souvignier | G06F 17/30067 |
| 2003/0154132 A1 * | 8/2003 | Ogawa | G06Q 20/20 705/16 |
| 2003/0207683 A1 * | 11/2003 | Lempio | H04M 1/72572 455/422.1 |
| 2004/0139317 A1 * | 7/2004 | Fronberg | G06F 21/6281 713/164 |
| 2004/0139328 A1 * | 7/2004 | Grinberg | G06F 21/6236 713/182 |
| 2004/0249765 A1 * | 12/2004 | Leon | G06F 21/34 705/64 |
| 2005/0251491 A1 * | 11/2005 | Medina | G06Q 20/3829 705/71 |
| 2005/0273618 A1 * | 12/2005 | Takemura | G11B 20/00086 713/182 |
| 2006/0009239 A1 * | 1/2006 | Ogren | H04W 4/029 455/456.6 |
| 2006/0046744 A1 * | 3/2006 | Dublish | H04L 63/0442 455/456.3 |
| 2006/0143481 A1 * | 6/2006 | Morten | G11B 20/00884 713/193 |
| 2006/0150211 A1 * | 7/2006 | Ritter | H04N 21/4415 725/31 |
| 2006/0173587 A1 * | 8/2006 | Oesterling | G07C 5/008 701/2 |
| 2006/0200412 A1 * | 9/2006 | Fahrny | H04N 21/835 705/50 |
| 2006/0200683 A1 * | 9/2006 | King | G06F 21/88 713/193 |
| 2006/0225065 A1 | 10/2006 | Chandhok et al. | |
| 2007/0081665 A1 * | 4/2007 | Kasahara | H04L 63/0428 380/28 |
| 2007/0086593 A1 * | 4/2007 | Denning | H04L 63/0428 380/286 |
| 2007/0100913 A1 * | 5/2007 | Sumner | G06F 21/6227 |
| 2007/0160201 A1 * | 7/2007 | Blom | H04L 9/0891 380/30 |
| 2007/0229678 A1 * | 10/2007 | Barrus | G11B 27/24 348/231.3 |
| 2008/0279533 A1 * | 11/2008 | Buttars | H04L 63/061 386/252 |
| 2008/0307514 A1 * | 12/2008 | Kusakari | G06F 21/31 726/7 |
| 2009/0179735 A1 * | 7/2009 | Van Rysselberghe | A47G 29/141 340/5.73 |
| 2009/0204817 A1 * | 8/2009 | Deana-Roga | H04L 63/0464 713/171 |
| 2009/0240937 A1 * | 9/2009 | Metzger | G06F 21/6218 713/167 |
| 2009/0316893 A1 * | 12/2009 | Fukushima | H04N 7/17309 380/210 |
| 2010/0011178 A1 | 1/2010 | Feathergill | |
| 2011/0126006 A1 * | 5/2011 | Dowdy | G06F 21/10 713/165 |
| 2011/0154130 A1 * | 6/2011 | Helander | G06F 21/51 714/48 |
| 2011/0252464 A1 * | 10/2011 | Sanjeev | H04W 12/06 726/7 |
| 2012/0331284 A1 * | 12/2012 | Kouladjie | H04L 9/083 713/153 |
| 2013/0007464 A1 * | 1/2013 | Madden | H04L 63/061 713/179 |
| 2013/0031598 A1 * | 1/2013 | Whelan | H04W 12/08 726/1 |
| 2013/0145160 A1 * | 6/2013 | Bursell | G06F 21/6218 713/168 |
| 2013/0268752 A1 * | 10/2013 | Morecki | H04L 63/0428 713/155 |
| 2014/0081665 A1 * | 3/2014 | Holmes | G16H 10/60 705/3 |
| 2014/0129847 A1 * | 5/2014 | Lee | G06F 21/10 713/193 |
| 2015/0039738 A1 * | 2/2015 | Subramani | H04L 67/1095 709/223 |
| 2015/0121541 A1 * | 4/2015 | Fay | G06F 21/10 726/27 |
| 2015/0127937 A1 * | 5/2015 | Ali | G06F 21/6218 713/165 |
| 2015/0131796 A1 * | 5/2015 | Milsted | H04L 9/0869 380/44 |
| 2015/0161410 A1 * | 6/2015 | Andersen | H04L 63/061 713/165 |
| 2015/0242594 A1 * | 8/2015 | Harjula | G06F 21/00 726/2 |
| 2015/0371470 A1 * | 12/2015 | Brown | G07C 9/00896 340/5.61 |

\* cited by examiner

REMOTE PRIVATE KEY SECURITY

CROSS-REFERENCE TO RELATED APPLICATIONS

This application claims priority to and the benefit of U.S. Provisional Patent Application No. 62/168,027 filed on May 29, 2015, the disclosure of which is herein incorporated by reference in its entirety.

TECHNICAL FIELD

The technical field may generally relate to data security and more particularly to private key encryption and access.

BACKGROUND

Certain data may be highly sensitive and only trusted to a few individuals or less. Sensitive data may be encrypted and may only be accessed after use of a security key to decrypt the data, however such data may be valuable and access to such data may be sought by inappropriate means. For example, access to the security key may be restricted but unauthorized individuals may attempt to, and may sometimes succeed in, accessing the security key and compromising security of the sensitive data. Individual countries or jurisdictions may have differing regulations relating to security compliance and procedures to access secure data or provide suitable identification. Complying with these differing regulations and requirements can be problematic when accessing secure data such as financial record or other valuable confidential information. A need therefor exists for systems and methods by which a user does not have the information to access secure data while still being able to access the stored data at a future point in time while also being able to comply with the requirements of different security regimes such as jurisdiction specific regulations.

BRIEF SUMMARY

In an embodiment, a method for remote private key security may include generating a private key. The method may further include generating encrypted data by encrypting data using an encryption algorithm, wherein the data is stored at a first location and the private key is for the encrypted data. The method may also include transmitting the private key to a remote private key deposit at a second location. Moreover, the method may include permitting access to the private key at the remote private key deposit to an individual at the second location in response to confirming an identity of the individual present at the second location.

One or more of the following features may be included. The method may include transmitting the encrypted data to a remote data center at a third location. The method may additionally include deleting the private key for the encrypted data in response to transmitting the private key to the remote private key deposit at the second location. The method may also include deleting the data stored at the first location in response to transmitting the encrypted data to the remote data center at the third location. The method may further include transmitting the private key to a temporary remote private key deposit at a fourth location prior to transmitting the private key to the remote private key deposit at the second location. The method may additionally include transmitting the encrypted data to a temporary remote data center at a fifth location prior to transmitting the encrypted data to the remote data center at the third location. The second location may be the same as the third location. The fourth location may be the same as the fifth location. The individual may have been previously selected to access the private key at the remote private key deposit on condition that the identity of the individual is confirmed at the second location. The method may further include confirming the identity of the individual present at the second location based upon, at least in part, biometric information provided by the individual at the second location. The biometric information may be related to a biometric identifier selected from the group consisting of a fingerprint, a retina, an iris, DNA, a palm, a hand, a handwriting sample, a biopsy, a behavior or a behavior identification, a body motoric, a gesture, a facial gesture and a voice. The private key may be stored and deleted based upon, at least in part, a defined retention policy. The private key may be inherited based upon, at least in part, the defined retention policy.

In an embodiment, a system for remote private key security may include a private key generator that generates a private key. The system may further include an encryption system that generates encrypted data by encrypting data using an encryption algorithm, wherein the data is stored at a first location and the private key is for the encrypted data. The system may also include a first transmitter that transmits the private key to a remote private key deposit at a second location. Moreover, the system may include a confirmation system that permits access to the private key at the remote private key deposit to an individual at the second location in response to confirming an identity of the individual present at the second location.

One or more of the following features may be included. The system may include a second transmitter that transmits the encrypted data to a remote data center at a third location. The private key for the encrypted data may be deleted in response to transmitting the private key to the remote private key deposit at the second location. The data stored at the first location may be deleted in response to transmitting the encrypted data to the remote data center at the third location. The confirmation system may confirm the identity of the individual present at the second location based upon, at least in part, biometric information provided by the individual at the second location. The biometric information may be related to a biometric identifier selected from the group consisting of a fingerprint, a retina, an iris, DNA, a palm, a hand, a handwriting sample, a biopsy, a behavior or a behavior identification, a body motoric, a gesture, a facial gesture and a voice.

In an embodiment, a system for remote private key security may include a remote private key deposit at a second location that receives a private key for encrypted data from a first location. The system may also include a confirmation system that permits access to the private key at the remote private key deposit to an individual at the second location in response to confirming an identity of the individual present at the second location.

One or more of the following features may be included. The system may include a remote data center at a third location that receives the encrypted data from the first location. The private key for the encrypted data may be deleted from the first location in response to receiving the private key at the remote private key deposit at the second location. Data corresponding to the encrypted data may be deleted from the first location in response to receiving the encrypted data at the remote data center at the third location. The confirmation system may confirm the identity of the individual present at the second location based upon, at least in part, biometric information provided by the individual at the second location. The biometric information may be related to a biometric identifier selected from the group consisting of a fingerprint, a retina, an iris, DNA, a palm, a hand, a handwriting sample, a biopsy, a behavior or a behavior identification, a body motoric, a gesture, a facial gesture and a voice.

The details of one or more implementations are set forth in the accompanying drawings and the description below. Other features and advantages will become apparent from the description, the drawings, and the claims.

DETAILED DESCRIPTION

Overview

A cloud provider or system administrator may institute backup and recovery or other procedures to ensure persistence and/or security of applications, data, or other resources accessed through one or more physical or virtual machines. For example, sensitive data may be encrypted (with or without being backed up) in order to restrict access of the data to certain individuals. Upon encryption, a private security key may be required in order to access the encrypted data (i.e., decrypt and view or use the data).

The private security key may be accessible to one or more individuals within an organization which owns the encrypted data. The organization may assume that these individuals will not permit access to or otherwise divulge the private security key to unauthorized individuals, but, in some situations, these trusted individuals may face pressure from unauthorized individuals to permit access to or otherwise divulge the private security key. Additionally, there may be situations where data for a particular set of people (e.g., very important people, government officials, business executives, etc.) by rule has to be stored in particular country or jurisdiction. Further, to access this data, authorized individuals must visit the country or jurisdiction where the data is stored. For example, such rules may exist under a country's laws or regulations. For example, in Russia, it may be required by law to store all private personal data of citizens in Russia. Using the techniques and features described herein, data may be stored remotely in Russia for a Russian citizen and a higher level of data security may be achieved in terms of access to the data.

In view of the forgoing, there is a need for a process or system that makes decryption of encrypted data more difficult, even for those permitted to access the underlying sensitive data and/or private security key. The techniques and features described in the present disclosure may improve data security when, for example, accessing user data using a scheme of distributed storage for encrypted data and a private security key. For example, the techniques and features described herein may be implemented on top of a distributed storage system by, in part, allowing an individual to control a location or jurisdiction in which data will be stored.

In an example, the data may be hosted with appropriate control as the individual may buy a server in a particular country or jurisdiction, generate and encrypt data, transmit the encrypted data to the server, and upload a private security key to another country or jurisdiction or to the same server but without the ability to access the private security key remotely. These techniques and features may be applied in connection with data backup or in connection with other secure methods of storing data, as, for example, backups may be a way to generate data before encryption. In some situations, encryption provided with a backup process may be used.

Figure 1:
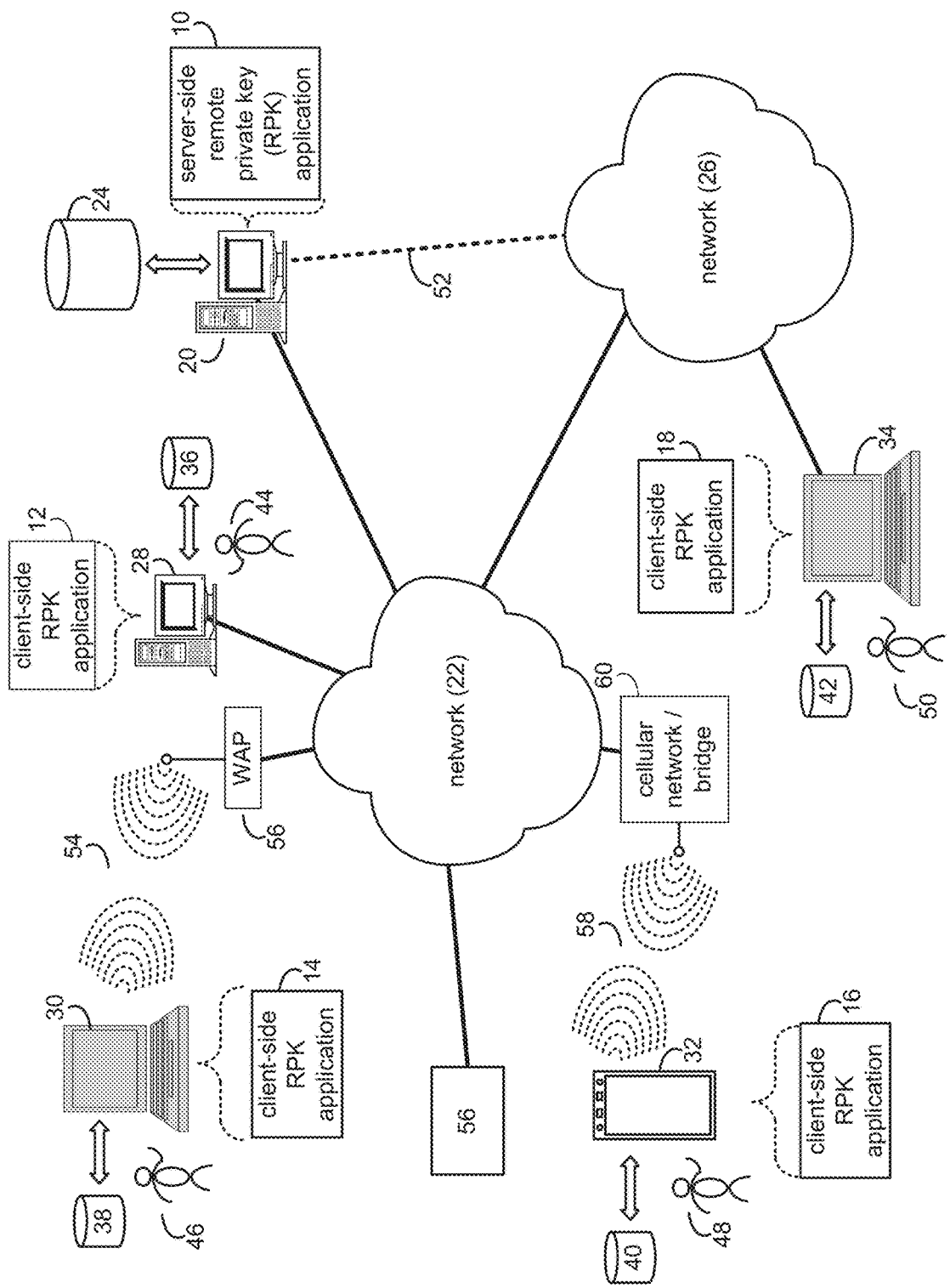
FIG. 1 depicts an example system that can execute implementations of the present disclosure.

Referring to FIG. 1, there is shown a server-side remote private key (RPK) application 10 and client-side RPK applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as RPK process 10. Further, one or more of client applications 12, 14, 16, and 18 may be referred to as a process configured to carry out one or more of the features described herein, such as RPK processes 12, 14, 16, and/or 18.

As will be discussed below and referring now to FIG. 4, RPK process or application 10, 12, 14, 16, or 18 may generate 300 a private key. The private key may be a private session key. The private session key may work for a single session only. RPK process 10, 12, 14, 16, or 18 may also generate 302 encrypted data by encrypting data using an encryption algorithm, wherein the data is stored at a first location and the private key is for the encrypted data. RPK process 10, 12, 14, 16, or 18 may further transmit 304 the private key to a remote private key deposit at a second location. RPK process 10, 12, 14, 16, or 18 may also transmit 306 the encrypted data to a remote data center at a third location. Additionally, RPK process 10, 12, 14, 16, or 18 may permit 308 to the private key at the remote private key deposit to an individual at the second location in response to confirming an identity of the individual present at the second location.

The RPK process may be a server-side process (e.g., server-side RPK process 10), a client-side process (e.g., client-side RPK process 12, client-side RPK process 14, client-side RPK process 16, or client-side RPK process 18), or a hybrid server-side/client-side process (e.g., a combination of server-side RPK process 10 and one or more of client-side RPK processes 12, 14, 16, 18).

System Overview

Referring to FIG. 1, server-side RPK process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side RPK process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side RPK processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side RPK processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side RPK processes 12, 14, 16, 18 and/or server-side RPK process 10 may be processes that run within (i.e., are part of) a cloud computing site, cloud computing application, cloud platform, or cloud environment. Alternatively, client-side RPK processes 12, 14, 16, 18 and/or server-side RPK process 10 may be stand-alone applications that work in conjunction with the cloud computing site, cloud computing application, cloud platform, or cloud environment. One or more of client-side RPK processes 12, 14, 16, 18 and server-side RPK process 10 may interface with each other (via network 22 and/or network 26).

Users 44, 46, 48, 50 may access server-side RPK process 10 directly through the device on which the client-side RPK process (e.g., client-side RPK processes 12, 14, 16, 18) is executed, namely client electronic devices 28, 30, 32, 34, for example. Users 44, 46, 48, 50 may access server-side RPK process 10 directly through network 22 and/or through secondary network 26. Further, server computer 20 (i.e., the computer that executes server-side RPK process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

RPK Process

For the following discussion, server-side RPK process 10 will be described for illustrative purposes and server computer 20 may run server-side RPK application 10 to carry out some or all of the techniques and features described here. It should be noted that server-side RPK process 10 may interact with client-side RPK process 12 and may be executed within one or more applications that allow for communication with client-side RPK process 12. However, this is not intended to be a limitation of this disclosure, as other configurations are possible (e.g., stand-alone, client-side RPK processes and/or stand-alone server-side RPK processes). For example, some implementations may include one or more of client-side RPK processes 12, 14, 16, and 18 in place of or in addition to server-side RPK process 10.

The systems and methods (e.g., RPK process 10) described herein relate to the security of physical or virtual machine backups, data, files, and/or folders or other confidential information and records such as customer lists, financial records, or other information or data of interest. In part, the systems and methods relate to strengthening security of data, encrypted data, and/or backup data. The systems described herein may include one or more memory elements for backup of software, databases, and physical or virtual machines, and computer storage products including instructions to be executed by a processor to cause the processor to implement the methods described herein.

Referring now to FIG. 1, one or more of users 44, 46, 48, and 50 may be cloud administrators or system administrators or may be cloud or system end-users. The cloud or system administrators may access and/or administer server computer 20 or client electronic devices 28, 30, 32, 34 (respectively). In an embodiment one or more of server computer 20 or client electronic devices 28, 30, 32, 34 may be a physical computer system, virtualization host device, or cloud computing client. The virtualization host device may include a virtual machine and may run a cloud or virtualization application such as VMWare™ or may include a bare-metal embedded hypervisor (e.g. VMware™ ESX™ and VMware™ ESXi™). Further, the virtualization host device may include a vCloud™ architecture that may enhance cooperation between hypervisors. RPK processes 10, 12, 14, 16, and/or 18 may include or may work in connection with an agent (e.g., a software module), which may include or may be configured to perform any number of the techniques or features described herein.

RPK processes 10, 12, 14, 16, and/or 18 may include a software component, executable code, function, subroutine, or other set of instructions designed to carry out one or more operations for remote private keys and strengthening data security. The techniques, features, and/or operations described herein may improve security for accessing data when using a scheme of distributed storing for encrypted data and a private security key, and is also applicable for improving security of data backups or for any other secure methods of storing data. For example, the techniques, features, and/or operations described herein may improve security when it is desired that an individual must visit a particular place to access the data being protected, and where no other way to decrypt or otherwise access the data should exist.

Further, the techniques, features, and/or operations described herein may also improve security when it is desired that an individual must prove they he/she has visited a particular place to access the data being protected, and where no other way to decrypt or otherwise access the data should exist. In an example, a business could advertise such a service.

Figure 3:
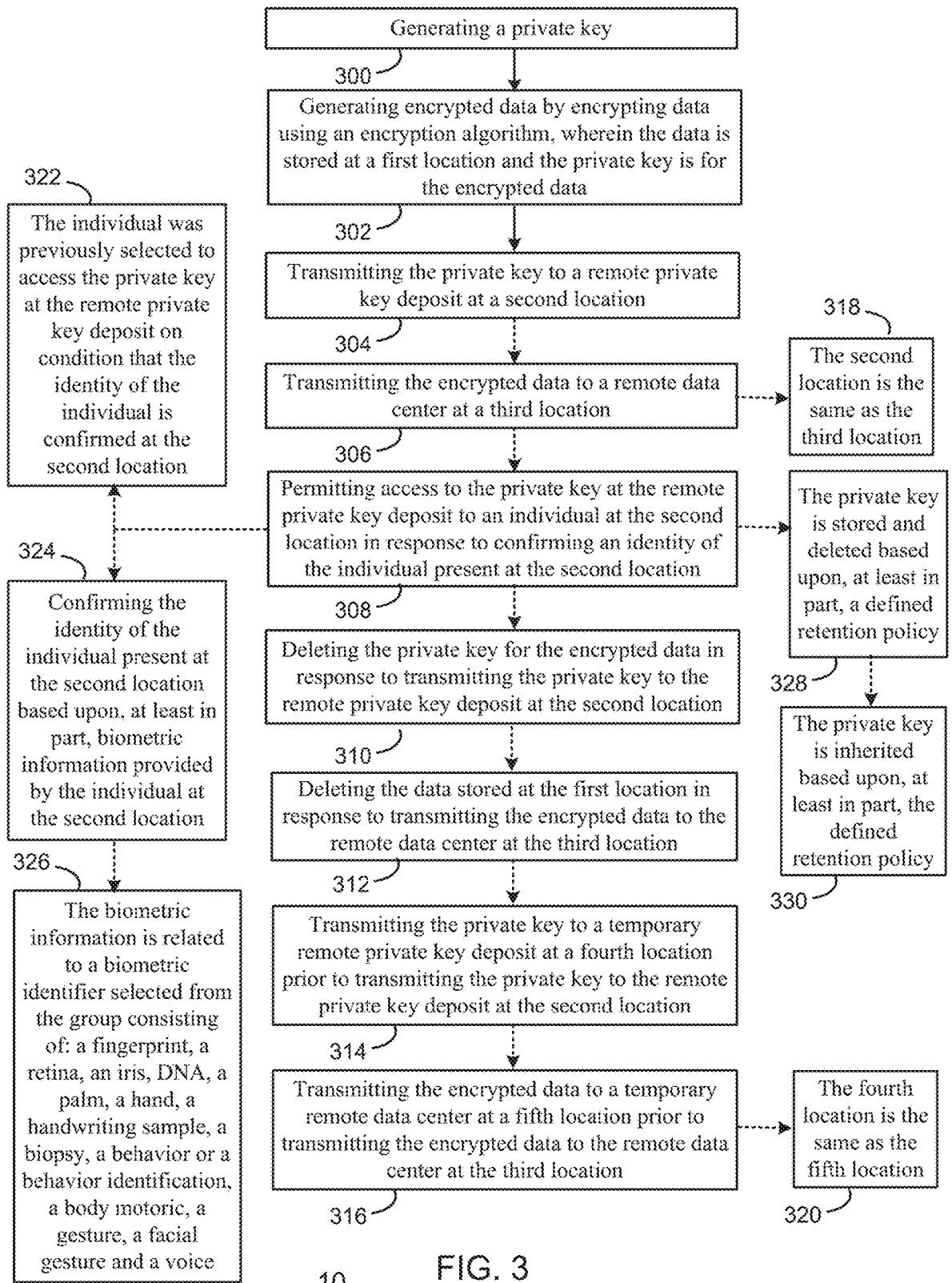
FIG. 3 is a flowchart illustrating an example process for remote private key security in accordance with the present disclosure.
Figure 4:
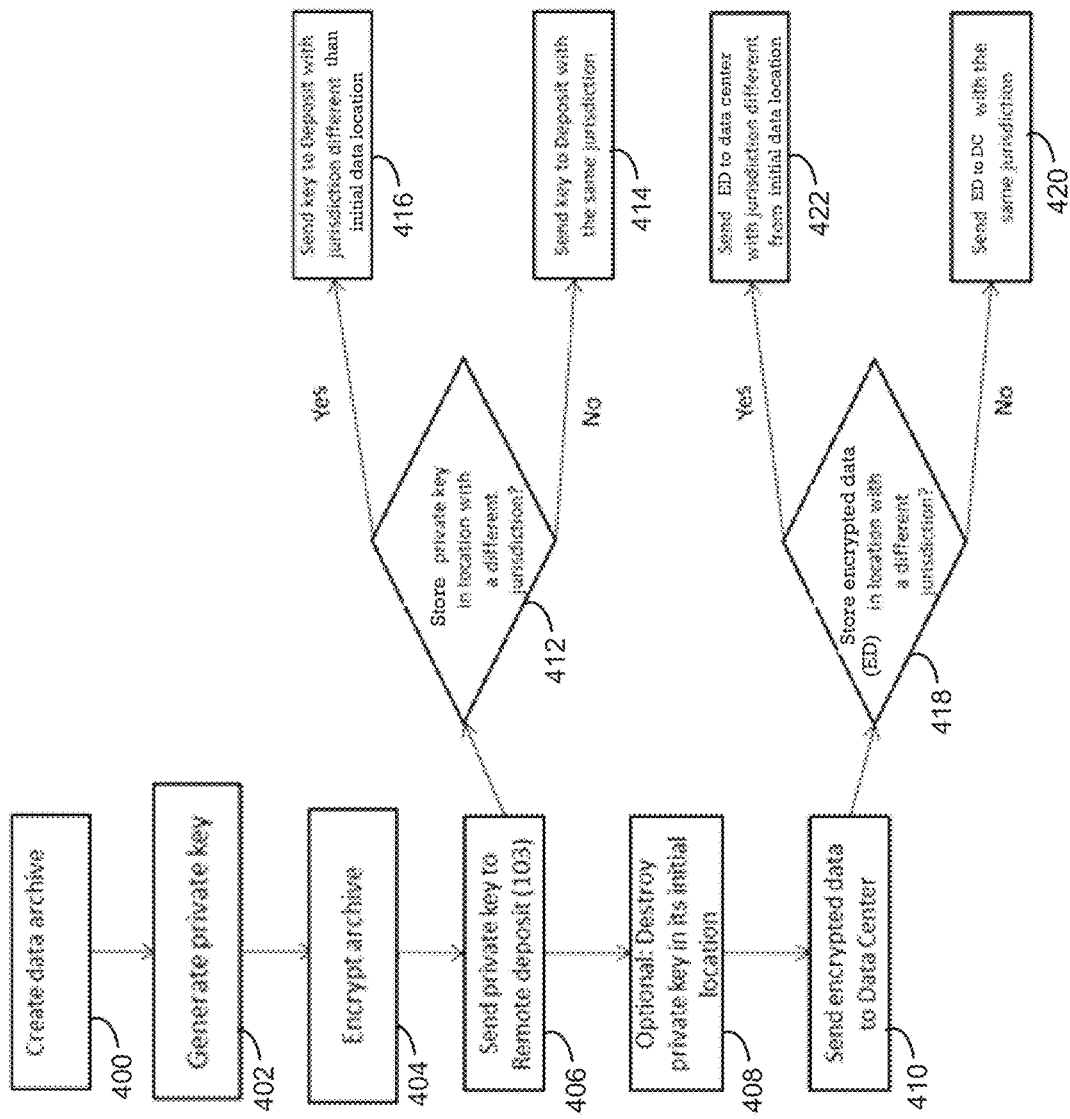
FIG. 4 is also flowchart illustrating an example process for remote private key security in accordance with the present disclosure.

Referring now to FIG. 3 and FIG. 4, one or more methods for remote private key security are described. For example, in an embodiment, data or a data archive may be created 400. This archive can be a file, an application, a data set, or other archive or information. The data created may be in any form and may be encrypted on the fly during connection to a remote storage to store the data. The data may exist in any format.

The data may be stored on local storage (e.g., a hard drive, flash drive etc.) or may be backed up into an archive. For example, referring now to FIG. 2, the data may be stored in local storage 101, shown in "Jurisdiction 1". Jurisdiction 1 may be any location where the data is stored locally or, in an embodiment, may represent a legal or otherwise recognized jurisdiction, such as a city, county, state, province, prefecture, territory, or country. Local storage 101 may be accessible via server computer 20 or one or more of client electronic devices 28, 30, 32, 34.

An organization or user (e.g., one or more of users 44, 46, 48, and 50) may decide that the data requires a high level of security. For example, the level of data security may be defined by a customer or by a policy related to the data (e.g. financial data). In an embodiment, the data itself may be a decryption key from another application or data. Further, in an embodiment, the source of the data or the type of data may vary (e.g., financial, private medical, corporate data stored by law, or any other type of data). The organization or user (e.g., a cloud or system administrator) may use a process or application (e.g., RPK process 10) that executes one or more of the techniques and features described herein to ensure that the data is secure.

In an embodiment, RPK process 10 may generate 300 (402) a private key. The private key may be for encrypted data at a first location (e.g., ""Jurisdiction 1"). The private key may be generated using standard key generation applications or algorithms. For example, a random key generator with pseudo random or true random generation, additional sources of entropy from different sources such as mouse movement, built-in RNG into CPU (e.g. Intel), a separate accessible device, or a separate external source accessible via network, etc., may be used. In an embodiment, a standard or customized private key generator may be used.

In an embodiment, RPK process 10 may generate 302 encrypted data by encrypting data using an encryption algorithm, wherein the data is stored at the first location and the private key is for the encrypted data. For example, a session key or random key generator may be used and applied to the data. Once the data is encrypted, the key may be deleted or destroyed. In an embodiment, a standard or customized encryption system may be used. The key can be bundled with the encrypted data and itself encrypted and secured for transmission to a remote data store. Typically, the encrypted data may be transmitted to a data center or remote storage (e.g., at the first location), but this may be optional. The encrypted data may also remain in the initial location. In an embodiment, only a private key transmission to the data center or remote storage may be mandatory. The first location may be any location where the data is stored locally (e.g., local storage 101) or, in an embodiment, may represent a legal or otherwise recognized jurisdiction as discussed above.

The encryption algorithm may be a strong encryption algorithm and may include two keys such as, for example, a public key and the private key. The public key may be used for encryption of the underlying data and the private key may be used to decrypt the encrypted data back into the underlying data. This process may be used to perform asymmetric cryptography and any process or algorithm for asymmetric cryptography may be used in connection with the techniques and features described herein to achieve remote private key security.

In an embodiment, any symmetric or asymmetric algorithm may be used for encryption, including homomorphic encryption. For example, for symmetric encryption, a session key may be generated, the data to be protected may be encrypted, the encrypted data may be uploaded, a second key may be generated, the first key (session key) may be encrypted, and the encrypted first key and the second key may be transmitted to storage. Further, for example, for asymmetric encryption, a session key may be generated, the data to be protected may be encrypted, the encrypted data may be uploaded, a second asymmetric key pair may be generated, the first key (session key) may be encrypted using the encryption key, and the encrypted first key and a second decryption key may be transmitted to storage. In an embodiment, the second key pair may be received or an encryption key from the storage where the data will be stored may be received. Further, in an embodiment, a second storage may be accessed to obtain the second key from a known source (e.g., via the Internet). Other encryption algorithms, systems, or schemes may also be used. In this way, the data or archive that requires security may be encrypted 404.

Further, RPK process 10 may transmit 304 the private key to a remote private key deposit at a second location. The private key may be transmitted over an encrypted channel. In an embodiment, a standard or customized transmitter may be used. The remote private key deposit at the second location may receive the private key for the encrypted data from the first location. In an embodiment, a standard or customized receiver may be used. Further, in an embodiment, the transmitter and/or receiver may be a hardware implemented transmitter and/or receiver or may be a software implemented transmitter and/or receiver.

Figure 2:
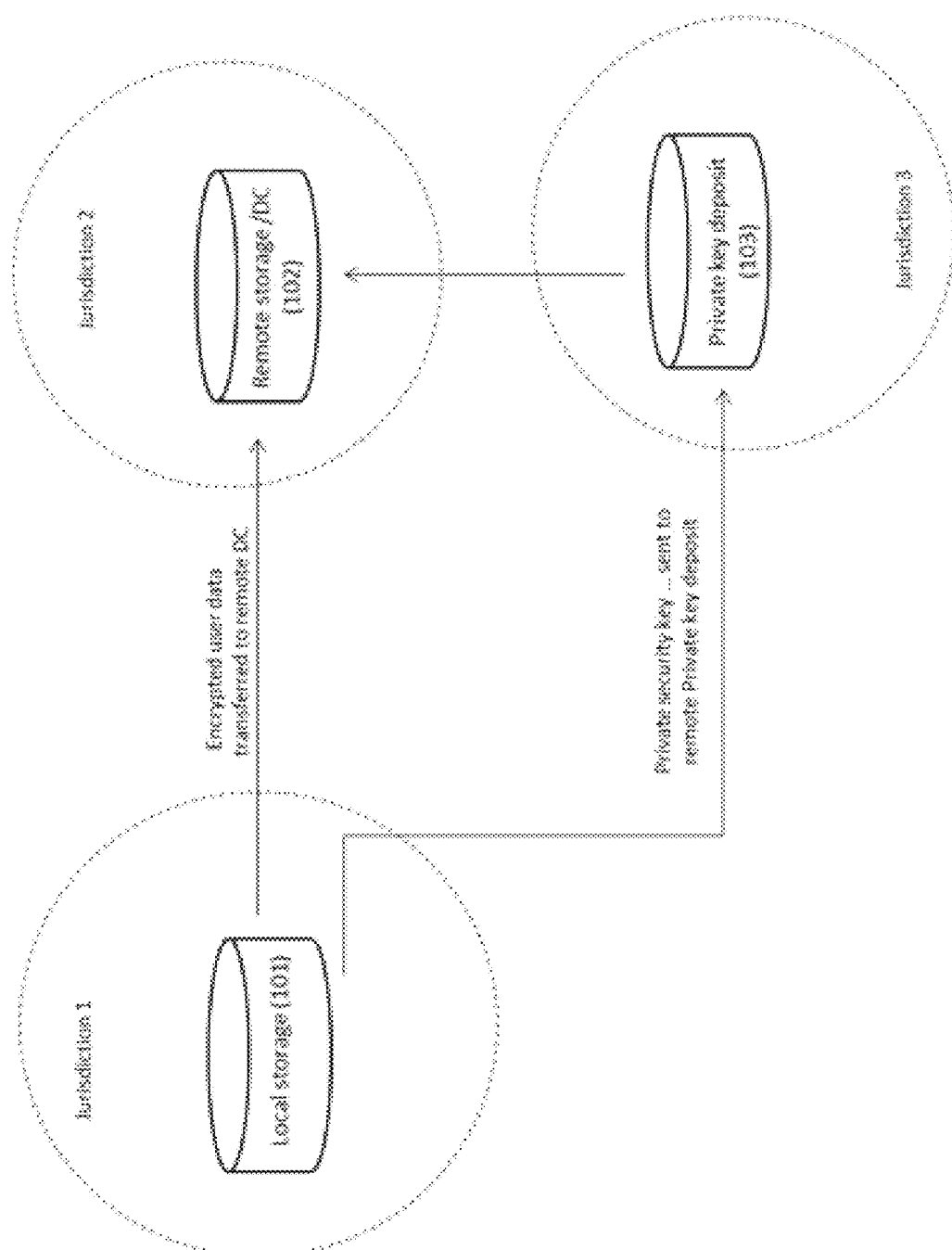
FIG. 2 is a diagrammatic flowchart illustrating an example architecture in accordance with implementations of the present disclosure.

Referring now to FIG. 2, the remote private key deposit may be private key deposit 103 shown in "Jurisdiction 3". For example, the private key may be transmitted electronically using a channel which meets security requirements of the individual or organization that encrypted the data (e.g., IPSec, SSL, SSH, or similar). In an embodiment, the private key may be transmitted using any other media such as flash drive or even hard copy (e.g., a paper document). Jurisdiction 3 may be any location where the organization has setup the private key deposit.

For example, the organization may use a third party data center for the private key deposit service. This may be any service provider that provides security and privacy services meeting the requirements of the organization. The service provider may use a suitable infrastructure for providing security and privacy services, including but not limited to a software infrastructure or special permissions. Additionally, in an embodiment, "Jurisdiction 3" may represent a legal or otherwise recognized jurisdiction, such as a city, county, state, province, prefecture, territory, or country. In this way, the private key may be sent 406 to the remote private key deposit (e.g., private key deposit 103).

RPK process 10 may also transmit 306 the encrypted data to a remote data center at a third location. In an embodiment, a standard or customized transmitter may be used. Referring now to FIG. 2, the remote data center may be remote storage/DC (data center) 102 shown in "Jurisdiction 2". Jurisdiction 2 may be any location where the organization has setup the remote data center. The remote data center may be a standard data center (for, e.g., data hosting) and may receive and store user data, decrypt data, and authenticate or authorize a user's identity for access the data as described herein.

In one embodiment, the data center may have records of the individuals authorized to access records from the source that sent the secure data and associated key. No others can access the data unless authorized by the source via communications to the remote data center. Additionally, in an embodiment, "Jurisdiction 2" may represent a legal or otherwise recognized jurisdiction, such as a city, county, state, province, prefecture, territory, or country. In this way, the encrypted data may be sent 410 to the remote data center (e.g., remote storage/DC 102). Alternatively, in an embodiment, RPK process 10 may transmit a copy of the encrypted data to a remote data center (e.g., remote storage/DC 102).

In an embodiment, RPK process 10 may delete 310 the private key for the encrypted data in response to transmitting the private key to the remote private key deposit (e.g., private key deposit 103) at the second location (e.g., "Jurisdiction 3"). In other words, the private key may be deleted or destroyed 408 from its initial location for security reasons (e.g., unauthorized access) but may persist at the remote private key deposit for future retrieval at the second location (e.g., "Jurisdiction 3"). In an embodiment, the private key may be deleted irreversibly. Further, in an embodiment, RPK process 10 may delete 312 the data stored at the first location (e.g., local storage 101 and/or "Jurisdiction 1") in response to transmitting the encrypted data to the remote data center (e.g., remote storage/DC 102) at the third location (e.g., "Jurisdiction 2"). In other words copies of the underlying/original data or the encrypted data may be deleted or destroyed from its initial location for security reasons (e.g., unauthorized access) but the encrypted data may persist at the remote data center for future retrieval and/or decryption at the third location (e.g., "Jurisdiction 2"). In an embodiment, the data may be deleted irreversibly. A copy of the secure data carried by a user or on a local storage could not be decrypted because the key is destroyed prior to allowing any local backups or other storage of the secure data.

Depending on the application, organizational and/or administrative choices, and/or the level of security necessary, the second location may be (318) the same as the third location. For example, in an embodiment, "Jurisdiction 2" may be the same as "Jurisdiction 3". In other words, independent of any recognized jurisdiction, the remote data center (e.g., remote storage/DC 102) and the remote private key deposit (e.g., private key deposit 103) may be at the same location (e.g., the same server site, building, or secure establishment).

It should be noted that the remote data center (e.g., remote storage/DC 102) and the remote private key deposit (e.g., private key deposit 103) may still be in a different location or in different locations than the original location of the initial or underlying data, but may be in the same jurisdiction as the initial or underlying data. In this way, unauthorized access to the initial or underlying data can be more easily prevented.

For example, and referring also to FIG. 4, it may be determined 412 that the private key does not need to be stored at a location with a different jurisdiction than the initial or underlying data. In general the data and encryption key may be stored in a special storage, data center, or deposit to reduce or minimize a possibility that secret, private, or critical data may be remotely stolen (by, e.g., hackers, etc.) For example, only personal physical presence of an authorized user may provide access to the private key. Thus, there is generally no way to access the private using the Internet or other network.

In an embodiment, the private key may be stored on storage in the same jurisdiction or in a different jurisdiction. This may depend on local laws or rules. For example, in Russia, there is a law requiring personal data to be stored in Russian territory, on servers in Russia. Further, in an embodiment, if a company has many branch offices, data may be stored in different jurisdictions depending on various laws or rules of the jurisdiction of each branch office. Additionally, in an embodiment, different jurisdictions may be located in the same place or facility (e.g., in the same data center).

As such, RPK process 10 may send 414 the private key to a remote private key deposit at a location in the same jurisdiction as the initial or underlying data. It may also be determined 412 that the private key does need to be stored at a location with a different jurisdiction than the initial or underlying data (e.g., due to local laws or rules as described above). As such, RPK process 10 may send 416 the private key to a remote private key deposit at a location in a different jurisdiction than the initial or underlying data.

Further, it may be determined 418 that the encrypted data does not need to be stored at a location with a different jurisdiction than the initial or underlying data (e.g., due to local laws or rules as described above). As such, RPK process 10 may send 420 the encrypted data to a remote data center at a location in the same jurisdiction as the initial or underlying data. It may also be determined 418 that the encrypted data does need to be stored at a location with a different jurisdiction than the initial or underlying data (e.g., due to local laws or rules as described above). As such, RPK process 10 may send 422 the encrypted data to a remote data center at a location in a different jurisdiction than the initial or underlying data.

In an embodiment, RPK process 10 may transmit 314 the private key to a temporary remote private key deposit at a fourth location prior to transmitting the private key to the remote private key deposit (e.g., private key deposit 103) at the second location (e.g., "Jurisdiction 3"). For example, the private key may be generated in a location from which the remote private key deposit is not accessible. In an embodiment, this may depend on a quality of communications available.

A user may send the private key when he or she has a slow connection via a mobile device. Thus, he or she may send the data to a closest server using a local network. As such, the private key may be sent to a temporary remote private key deposit at a fourth location which is accessible from the location at which the remote private key was generated, and then subsequently sent to the remote private key deposit (e.g., private key deposit 103) at the second location (e.g., "Jurisdiction 3").

Additionally, in an embodiment, RPK process 10 may transmit 316 the encrypted data to a temporary remote data center at a fifth location prior to transmitting the encrypted data to the remote data center at the third location. For example, the encrypted data may be generated in a location from which the remote data center is not accessible (e.g., due to communications limitations as described above). As such, the encrypted data may be sent to a temporary remote data center at a fifth location which is accessible from the location at which the encrypted data was generated, and then subsequently sent to the remote data center (e.g., remote storage/DC 102) at the third location (e.g., "Jurisdiction 2").

In an embodiment, the encrypted data is immediately sent from the temporary remote data center at the fifth location to the remote data center or is sent as soon as possible without delay. In an embodiment, if it is not possible to quickly send the encrypted data from the temporary remote data center at the fifth location to the remote data center, or if obstacles are encountered, the encrypted data may be removed in the temporary remote data center for security reasons. Time frame for removing the data from the temporary remote data center for security reasons may be defined in a privacy and/or security policy by the organization.

Further, depending on the application, organizational and/or administrative choices, and/or the level of security necessary, the fourth location may be (320) the same as the fifth location. In other words the temporary remote data center and the temporary remote private key deposit may be at the same location (e.g., the same server site, building, or secure establishment).

At some point, the encrypted data and thus the private key may be needed by the organization or user that encrypted the data and sent the private key to begin with. RPK process 10 may permit 308 access to the private key at the remote private key deposit (e.g., private key deposit 103) to an individual at the second location (e.g., "Jurisdiction 3") in response to confirming an identity of the individual present at the second location (e.g., "Jurisdiction 3"). For example, and referring also to FIG. 5, the individual or user may physically arrive 500 at the private key deposit 103. In an embodiment, the second location may be a data center or other service that may provide identification or authorization service for confirming the identity of the individual present. Further, in an embodiment, a standard or customized confirmation system may be used to permit access to the private key in response to confirming an identity of the individual present at the second location. The confirmation may be, for example, a biometric information confirmation system configured to confirm biometric information described herein.

In an embodiment, biometric information or biometric identification may be used in combination with any documented information or documented identification for confirmation purposes. For example, one or more of a certificate, passport, driver license, or personal ID may be used in combination with biometric information for confirmation purposes.

The individual or user may have been previously selected (322) to access the private key at the remote private key deposit (e.g., private key deposit 103) on condition that the identity of the individual is confirmed at the second location. In an embodiment, a policy may be established regarding how the individual is selected by the organization. The policy conditions may include rules created by the organization consistent with a defined privacy and/or security policy.

Further, confirming (324) the identity of the individual or user present at the second location may be based upon, at least in part, biometric information provided by the individual at the second location (e.g., at the private key deposit 103). Additionally the biometric information may be related (326) to a biometric identifier selected from the group consisting of a fingerprint, a retina, an iris, DNA, a palm, a hand, a handwriting sample, a biopsy, a behavior or a behavior identification, a body motoric, a gesture, a facial gesture and a voice. The biometric information used may depend on the significance or criticality of the data being protected. For example, in an embodiment, voice recognition may be used.

In an embodiment, the remote private key deposit and or an administrator thereof may create an account for the individual selected to have access to the private key. For example, for the purposes of creating the account, the individual may identify himself or herself remotely. The identifier for confirmation may include an IP address, work number, or other identifier unique to the individual selected.

Figure 5:
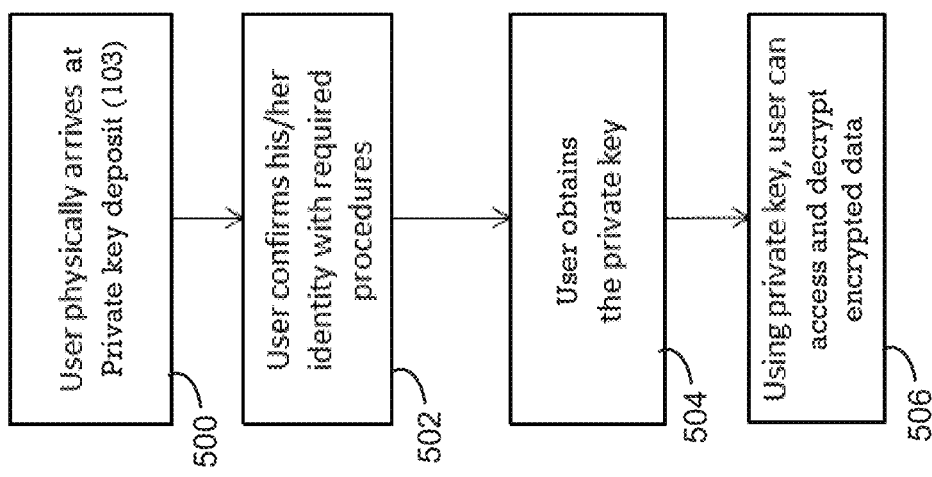
FIG. 5 is also flowchart illustrating an example process for remote private key security in accordance with the present disclosure.

It should be noted that the user may only obtain the private key from the remote private key deposit after he or she confirms his or her identity by physically visiting the remote private key deposit and presenting any necessary documents or providing anthropometric or biometric information (e.g., fingerprints, retinal information etc.). Referring also to FIG. 5, the individual or user may confirm 502 his or her identity with the required procedures. The individual or user may then obtain 504 the private key. The medium on which or via which the user obtains the private key may be defined in a privacy or security policy by the organization. For example, a retention policy regarding storing of private key may be defined. This policy may be defined by different instructions, contracts, agreements, etc., and may include rules regarding how long the private key may be stored and when it may be deleted, depending on various circumstances. The private key may be stored and deleted 328 based upon the defined retention policy.

Additionally, the retention policy may include a policy or procedure regarding inheritance, i.e., who or what can inherit the access rights associated with the private key (according to local laws or according by contract/agreement) in cases of death, disability, or dispositive scenarios. Also undetermined generically identified persons may be mentioned in the policy. For example, a boss or supervisor of an employee who has access rights may gain access rights if the employee is no longer with the organization, becomes seriously injured, or passes. The private key may be inherited 330 based upon the retention policy and/or local laws or terms and conditions of an agreement. Using the private key, the user may access and decrypt 506 the encrypted data.

Where the user may access and/or decrypt the data may be defined in a privacy or security policy by the organization.

In an embodiment, the authenticator at the remote private key deposit may access the encrypted data and decrypt the data at the remote private key deposit upon confirmation of the identity of the accessing individual. Further, in an embodiment, the encrypted data can be decrypted remotely with the private key for restore. Further, the private key may be printed and transferred non-electronically upon confirmation of the identity of the accessing individual. After accessing and restoring the data, the data can be re-encrypted and another private key may be generated.

Further, it should be noted that because the individual or user must visit the remote private key deposit in order to obtain the private key and decrypt the data, no person has the private key in their possession prior to that instance. In other words the private key cannot be hacked, stolen, or obtained via force or pressure, from the individual or user or other individuals or users because no person has possession of the private key other than the remote private key deposit, which is at a different location than where the initial or underlying data was located. The requirement that the previously selected individual must visit the remote private key deposit to access the private key may provide an added level of security. For example, in an embodiment, the initial creator of the private key may not be the person selected to access the private key once it is sent to the remote private key deposit and destroyed. As such, even the initial creator of the private key cannot access the data because the private key does not exist locally.

Different jurisdictions may have different regulations as they may pertain to data access. For example, a subdivision of a company which may be in a different location than the parent company may have contradicting of requirements for data storage when compared to the parent company. The parent company may want one procedure regarding access of data. For example, different jurisdictions may have different rules which may be adverse or inconsistent with one another. The parent company may have a general policy that they want a single regulation over different locations. Using the techniques and features described herein, the parent company could have one location for compliance (e.g., the remote private key deposit).

In an embodiment, only a set of individuals under agreement with the remote private key deposit may access the private key. This set of individuals may provide biometric or other data used for identification when an agreement is reached with the remote private key deposit. Further, in an embodiment, the data can be bound to an operation that allows an individual to perform the operation only by providing the data. For example, to access money and close an account, an individual must provide certain data to perform that operation. In this situation, the data is not only the backup, but also is related to an allowance of operations. In an embodiment, this may be an additional option to maintain privacy and set different levels of access.

Further, in an embodiment, if there is an incremental backup of the data that is to be encrypted, a private key is always new and created for each instance of the backup. The private keys may be separated by different channels. For example, access to the private key may be differentiated for different individuals depending on a security and/or privacy policy defined by the organization. In an embodiment, an individual may be permitted to decrypt data, but not to copy the data. In another example, an individual may have permission to access information about a balance of a bank account, but may lack permission to withdraw or spend money from the bank account.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for remote private key security, the method comprising:
   generating a private key;
   generating encrypted data by encrypting data using an encryption algorithm, wherein the data is stored at a first location and the private key is for the encrypted data, the encryption algorithm running on a computer-based encryption system;
   transmitting the private key, using a transmitter, to a remote private key deposit at a second location, wherein the private key is retained at the remote private key deposit to be accessed by an individual at the second location; and permitting access, using a computer-based confirmation system, to the private key at the remote private key deposit to the individual at the second location in response to confirming an identity of the individual present at the second location, wherein confirming comprises the individual physically visiting the second location.

2. The method of claim 1, further comprising:
transmitting the encrypted data to a remote data center at a third location.

3. The method of claim 2, further comprising:
deleting the data stored at the first location in response to transmitting the encrypted data to the remote data center at the third location.

4. The method of claim 2, further comprising:
transmitting the encrypted data to a temporary remote data center at a fifth location prior to transmitting the encrypted data to the remote data center at the third location.

5. The method of claim 4, wherein the fourth location is the same as the fifth location.

6. The method of claim 2, wherein the second location is the same as the third location.

7. The method of claim 1, further comprising:
deleting the private key for the encrypted data in response to transmitting the private key to the remote private key deposit at the second location.

8. The method of claim 1, further comprising:
transmitting the private key to a temporary remote private key deposit at a fourth location prior to transmitting the private key to the remote private key deposit at the second location.

9. The method of claim 1, wherein the individual was previously selected to access the private key at the remote private key deposit on condition that the identity of the individual is confirmed at the second location.

10. The method of claim 1, further comprising:
confirming the identity of the individual present at the second location based upon, at least in part, biometric information provided by the individual at the second location.

11. The method of claim 10, wherein the biometric information is related to a biometric identifier selected from the group consisting of: a fingerprint, a retina, an iris, DNA, a palm, a hand, a handwriting sample, a biopsy, a behavior or a behavior identification, a body motoric, a gesture, a facial gesture and a voice.

12. The method of claim 1, wherein the private key is stored and deleted based upon, at least in part, a defined retention policy.

13. The method of claim 12, wherein the private key is inherited based upon, at least in part, the defined retention policy.

14. The method of claim 1, wherein the individual is present at the second location at the time access is permitted to the private key, wherein the first location and the second location are different legal jurisdictions.

15. A system for remote private key security, the system comprising:
a computer-based private key generator that generates a private key;
a computer-based encryption system configured to execute an encryption algorithm, wherein the data is stored at a first location and the private key is for decrypting data encrypted using the encryption algorithm;
a first transmitter that transmits the private key to a remote private key deposit at a second location, wherein the private key is retained at the remote private key deposit to be accessed by an individual; and
a computer-based confirmation system configured to confirm identity of the individual, wherein the computer-based confirmation system is physically present at the second location and permits access to the private key at the remote private key deposit to the individual at the second location in response to confirming an identity of the individual present at the second location, wherein confirming comprises the individual physically visiting the second location.

16. The system of claim 15, further comprising:
a second transmitter that transmits the encrypted data to a remote data center at a third location.

17. The system of claim 16, wherein the data stored at the first location is deleted in response to transmitting the encrypted data to the remote data center at the third location.

18. The system of claim 15, wherein the private key for the encrypted data is deleted in response to transmitting the private key to the remote private key deposit at the second location.

19. The system of claim 15, wherein the confirmation system confirms the identity of the individual present at the second location based upon, at least in part, biometric information provided by the individual at the second location.

20. The system of claim 19, wherein the biometric information is related to a biometric identifier selected from the group consisting of: a fingerprint, a retina, an iris, DNA, a palm, a hand, a handwriting sample, a biopsy, a behavior or a behavior identification, a body motoric, a gesture, a facial gesture and a voice.

21. The method of claim 15, wherein the individual is present at the second location at the time access is permitted to the private key, wherein the first location and the second location are different legal jurisdictions.

22. A system for remote private key security, the system comprising:
a remote private key deposit at a second location that receives a private key for encrypted data from a first location, wherein the private key is retained at the remote private key deposit to be accessed by an individual; and
a computer-based confirmation system configured to confirm identity of the individual, wherein the computer-based confirmation system permits access to the private key at the remote private key deposit to the individual at the second location in response to confirming an identity of the individual present at the second location, wherein confirming comprises the individual physically visiting the second location.

23. The system of claim 22, further comprising:
a remote data center at a third location that receives the encrypted data from the first location.

24. The system of claim 23, wherein data corresponding to the encrypted data is deleted from the first location in response to receiving the encrypted data at the remote data center at the third location.

25. The system of claim 22, wherein the private key for the encrypted data is deleted from the first location in response to receiving the private key at the remote private key deposit at the second location.

26. The system of claim 22, wherein the confirmation system confirms the identity of the individual present at the second location based upon, at least in part, biometric information provided by the individual at the second location.

27. The system of claim 26, wherein the biometric information is related to a biometric identifier selected from the group consisting of: a fingerprint, a retina, an iris, DNA, a palm, a hand, a handwriting sample, a biopsy, a behavior or a behavior identification, a body motoric, a gesture, a facial gesture and a voice.

28. The method of claim 22, wherein the first location and the second location are different legal jurisdictions.

\* \* \* \* \*